United States Patent [19]

Brand et al.

[11] Patent Number: 5,764,504
[45] Date of Patent: *Jun. 9, 1998

[54] UNINTERRUPTIBLE POWER SUPPLY WITH FAULT TOLERANCE IN A HIGH VOLTAGE ENVIRONMENT

[75] Inventors: Gerald J. Brand, Derry, N.H.; Don L. Drinkwater, Carlisle, Mass.

[73] Assignee: Digital Equipment Corporation, Maynard, Mass.

[*] Notice: The term of this patent shall not extend beyond the expiration date of Pat. No. 5,694,312.

[21] Appl. No.: 816,592

[22] Filed: Mar. 13, 1997

Related U.S. Application Data

[63] Continuation of Ser. No. 541,655, Oct. 10, 1995, Pat. No. 5,694,312, which is a continuation of Ser. No. 164,649, Dec. 8, 1993, abandoned, which is a continuation of Ser. No. 896,260, Jun. 10, 1992, abandoned.

[51] Int. Cl.⁶ .................. H02M 1/00; H02J 9/00
[52] U.S. Cl. .................. 363/144; 363/65; 307/66
[58] Field of Search .................. 363/144, 97, 84, 363/65; 307/48, 64, 65, 66, 80, 81; 304/431.11; 323/267

[56] References Cited

U.S. PATENT DOCUMENTS

| 3,721,890 | 3/1973 | Ettinger et al. | 363/144 |
| 4,860,185 | 8/1989 | Brewer et al. | 363/41 |
| 5,019,717 | 5/1991 | McCurry et al. | 307/66 |

FOREIGN PATENT DOCUMENTS 0272961   6/1988   European Pat. Off. .

*Primary Examiner*—Adolf Berhane
*Attorney, Agent, or Firm*—Michael A. Rodriguez; Ronald C. Hudgens; Mary M. Steubing

[57] ABSTRACT

An architecture, module set and platform to provide total power protection from utility disturbances. Power supplies employing the invention are built on power buses for utility AC input, battery DC input and conditioned AC output housed in the platform and employ modular line-to-AC-or-DC power-factor-correcting converters and battery/charger sets either housed in the platform or integrated as part of the front end power supply for a critical load such as a computer.

28 Claims, 8 Drawing Sheets

5,764,504

UNINTERRUPTIBLE POWER SUPPLY WITH FAULT TOLERANCE IN A HIGH VOLTAGE ENVIRONMENT

This is a continuation of Ser. No. 08/541,655 filed on Oct. 10, 1995 U.S. Pat. No. 5,694,312, which is a continuation of Ser. No. 08/164,649 filed on Dec. 8, 1993 now abandoned, which is a continuation of Ser. No. 07/896,260 filed on Jun. 10, 1992 now abandoned.

FIELD OF THE INVENTION

This invention is related generally to the field of power supply to electronic equipment, in particular, power protection circuitry and "uninterruptible" power supplies.

BACKGROUND OF THE INVENTION

Electronic computer equipment generally requires regulated power supplies that protect against non-uniform utility or line power. Often, critical loads such as computers require uninterrupted power supplies.

A current state-of-the art "front end" computer power system is shown in FIG. 1, comprising an AC/DC input power conditioning function shown in block 50, a DC bus 40, and one or more DC/DC converters/regulators 30. A rectifier/voltage doubler 10 converts utility power 5 (one-phase or three-phase AC) into high voltage DC (160–425 VDC). An energy storage/ripple filter 20 provides limited protection against power sags and further filters any AC component on the high voltage DC bus 40. A shunt capacitor (not shown) forms a simple implementation of such an energy storage/ripple filter circuit.

Such an implementation creates a system that draws energy from the utility only when the AC input voltage 5 rises above the filtered DC output voltage 40. Thus, large spikes of current are drawn from the utility. These large current spikes result in a higher than required volt-ampere product. The high volt-ampere product causes a low power factor ("P.F."). Power factor is given in terms of watts/(volts x amperes). A low power factor is considered undesirable by the utility, and often customers are surcharged when their power factor drops below a certain level.

The current spikes also cause harmonic distortion on the utility input 5. Many countries are imposing strict limitations on the amount of harmonic distortion that may be placed on the utility. Implementation of the energy storage/ripple filter 20 with a series inductor and shunt capacitor (not shown) offers improved power factor correction and reduced harmonic distortion at the expense of output voltage and energy lost through heat. For high power requirements, these components may be bulky, heavy and require special cooling systems.

A DC/DC converter/regulator 30 converts the unregulated high voltage (typically 160–425 VDC) DC on bus 40 into a highly regulated voltage suitable to power sensitive electronic components such as those used in computer logic circuits. This voltage (typically 5 VDC or less), isolated, regulated, and current-limited, is applied to low voltage bus 35. Blocks 30' and 30" represent other converters that may be attached to the high voltage DC bus 40.

Particularly for applications involving computer memory systems, the power supply of FIG. 1 may be further adapted. For example, FIG. 2 illustrates an addition to the system of FIG. 1 of a battery subsystem 60 to allow the supply of energy to a memory system when a power sag or outage occurs. The AC/DC input conditioner 50 is equivalent to blocks 10 and 20 in FIG. 1. Diode 70 is placed in series with the voltage bus 40 and a memory regulator system 90. The memory regulator 90 provides power to the computer's memory system.

The battery subsystem 60 provides the appropriate DC voltage during utility voltage sags or outages. This "battery back-up" voltage is connected to the high voltage DC bus 40 through diode 80. The battery subsystem 60 is comprised of a battery charger 61, a battery 62 (typically 48 or 96 VDC), and a DC/DC boost converter 63 (typically to approximately 160 VDC).

The system as illustrated in FIG. 2 does not maintain power to the entire computer during utility power sags or outages, but only to the memory or a portion of the memory. Although power is maintained to the memory system to maintain the current status of data processing, the computer operator experiences the loss of his/her computer resources. This condition is unacceptable in many computer environments.

If the computing environment requires non-interruption during power sags or outages, an "uninterruptible" power supply ("U.P.S.") must be added. FIG. 3 illustrates the use of such a system. The U.P.S. 100 is placed in series with the utility 5 and the computer or any critical load 120. The U.P.S. maintains AC voltage to the load whenever the utility power sags or experiences an outage.

FIG. 4 is a block diagram of a typical U.P.S. The rectification block 130, which may include a three-phase bridge or a single-phase voltage doubler, provides an unregulated DC voltage to bus 140 in much the same way as 10 in FIG. 1. Energy storage and filtering is provided by block 170 (which may be an energy storage device such as a capacitor) in a manner similar to 20 in FIG. 1. The DC/AC inverter 180 converts the DC voltage on bus 140 to an AC voltage capable of powering a computer or other critical load, typically domestic 120 VAC at 60 Hz or European 240 VAC at 50 Hz. Current technology, especially for those systems working in a three-phase environment, uses a power switch 181 to excite a transformer 182 (which also functions as an isolation transformer) to create the AC output voltage. A harmonic filter 190 filters the output voltage to prevent high frequency harmonic components from leaving the system. The battery stack 160 provides DC voltage (typically approximately 400 VDC) through diode 220 to bus 140 whenever a utility power sag or outage occurs. A charger 150 provides a means for restoring energy to the battery stack 160.

A state-of-the art U.P.S. may provide 20 KVA output, enough to run a number of mini- or mainframe computers, or an entire computer room or office environment. This is achieved in the configuration shown in FIG. 4 by directing nearly 20 KW of power in one path through components designed to handle such power, such as very large capacitors and inductors. The isolation transformer 182 in such a U.P.S. may weigh well over one hundred pounds. Although the batteries 160 may be stored separately in a second refrigerator-size cabinet from the other components, and some of the components, such as the rectifier 130, the power switch 181, and the bypass/static switch 200 may be removable for repair, the large capacitors and inductors are not easily accessed and may remain hazardous even when the U.P.S. is taken off-line. Moreover, the state-of-the art U.P.S. is not fault-tolerant: if the power switch 181 fails, the U.P.S. must be taken off-line; if a battery in the stack 160 fails, the U.P.S. may not provide back-up power when needed.

The current use of a U.P.S. 100 to power a computer 120 or similar piece of equipment (FIG. 3) results in needless redundancy, as apparent from FIG. 5, in which the typical state-of-the art U.P.S. illustrated in FIG. 4 is simplified in block 100, and the typical computer "front end" power supply illustrated in FIG. 1 is simplified in block 120. As readily seen, because utility AC is converted to DC at 230, reconverted to AC at 250, and reconverted to DC at 300, not only are the latter two stages redundant, but the AC output stage 260 and AC input stage 290 are also redundant.

The current state-of-the art requires each power supply problem (regulation, "uninterruptibility," power level, input phases, line voltage, etc.) to be addressed with a unique hardware set. This approach is inefficient, costly, redundant and difficult for users to implement.

SUMMARY OF THE INVENTION

The invention provides a common solution for a variety of power protection problems through a functionally modular architecture, module set and platform. Using the modules and platform, a variety of highly regulated, uninterruptible power supplies may be built that provide protection against all types of utility disturbances, including voltage spikes, overvoltage conditions, voltage sags and voltage outages. Power systems employing the invention also include means for reducing input current harmonic distortion and improving power factor presented to the utility.

The modules and platform of the invention may be combined as a stand-alone U.P.S., from which conventional computers and other critical loads may draw electrical power, or as a substitute for the front end power system of computers and other critical loads. By selecting and configuring the modules of the invention, the user of a power supply system may solve specific problems with common hardware, and manufacturers of computers and other critical loads may integrate into their products power protection features normally only available from a separate U.P.S.

The modularity of the invention resides primarily in a plurality of identical line-to-AC-or-DC modules (herein called "transverters") and identical battery/charger modules. These modules are organizable within a single cabinet with fault-tolerant redundancy and are easily and safely removed and replaced from the front of a single large-refrigerator-size platform, and together provide, as an example, up to 20 KVA of highly regulated uninterrupted electricity.

Each line-to-AC transverter converts one phase of AC power to DC, allows a cut-in of battery power, and converts the DC back to "clean" AC in the stand-alone U.P.S. application. Because a plurality of transverters are used in parallel in the stand-alone U.P.S. implementation to convert a large amount of power, the individual transverter module is relatively small. By constructing AC output signals using high-frequency components, heavy inductor cores may be eliminated so that a 3.33 KVA unit weighs on the order of forty pounds. Such a transverter unit may be used alternately to replace the front-end power system for large minicomputers and mainframe computers. In the stand-alone U.P.S. mode, two transverters may be used for each of three phases to provide 20 KVA, and a third transverter per phase may be included in the cabinet to share power and to offer a level of redundancy should one of the transverters fail.

Each battery/charger module, weighing approximately 200 pounds, is mounted on wheels and safely manageable by a single person. Each contains eight 12-volt batteries, charged optimally four in series (48 V), all connected in series for a total of 96 V per module. Three modules are connected in series within the platform to provide the cut-in battery power for up to seven minutes in a 20 KVA U.P.S. The platform provides room for a second set of batteries connected in parallel to the first set to provide fault-tolerant redundancy or fifteen total minutes of battery power.

The large-refrigerator-size platform provides room for nine transverter modules and six battery/charger modules in the 20 KVA implementation mentioned. Each transverter is connected at the back plane of the platform to control signals, to three architecture-defining power buses, a utility AC input bus, a battery DC input bus, and a conditioned AC output bus. One, two or three transverters are organized for each phase to receive on bus bars a single phase input of a poly-phase AC line input and to output on bus bars a single phase AC output. Each transverter receives on bus bars the negative and positive (288 VDC) of the battery stack of three battery/charger modules or parallel stack of six battery/charger modules. Each transverter receives control signals on connections on the back plane for DC cut-in and inverter functions.

The architecture offers functional flexibility and fault-tolerant redundancy not previously available. Servicing is simplified by the modularity. Standardization of transverters, battery/charger modules, as well as control circuits, is made possible to allow stocking of spares even beyond spares in the cabinet, thereby providing very high levels of availability of the U.P.S. The U.P.S. is configurable to one or three-phase operation, and to 10 KVA or 20 KVA operation, to seven- or fifteen-minute backup, and to U.S. or European line voltages.

The architecture allows integration of total power protection within the computer or critical load by defining common interfaces and standardizing subassemblies. For example, a line-to-DC version of the transverter may be substituted for the front end power system of a computer or other critical-load to form an integrated power system that would provide U.P.S. functionality with the addition of batteries. The batteries may be the same battery/charger modules used in the stand-alone U.P.S. embodiment and may be housed in the same cabinet.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
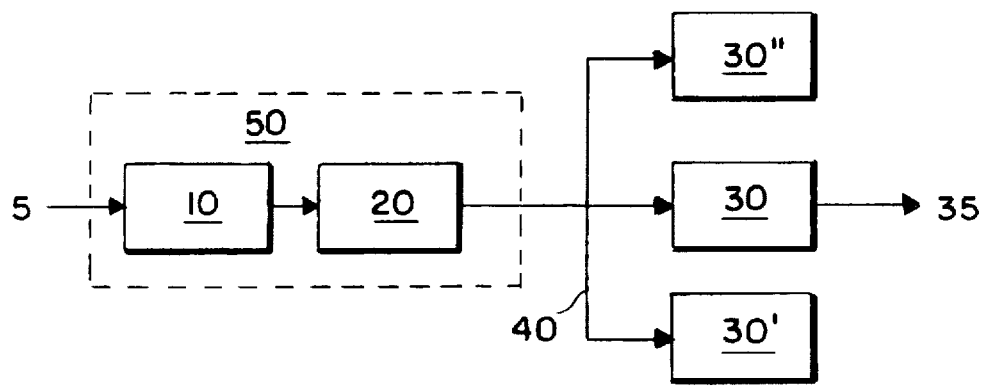
FIG. 1 depicts a prior art front end computer power system.
Figure 2:
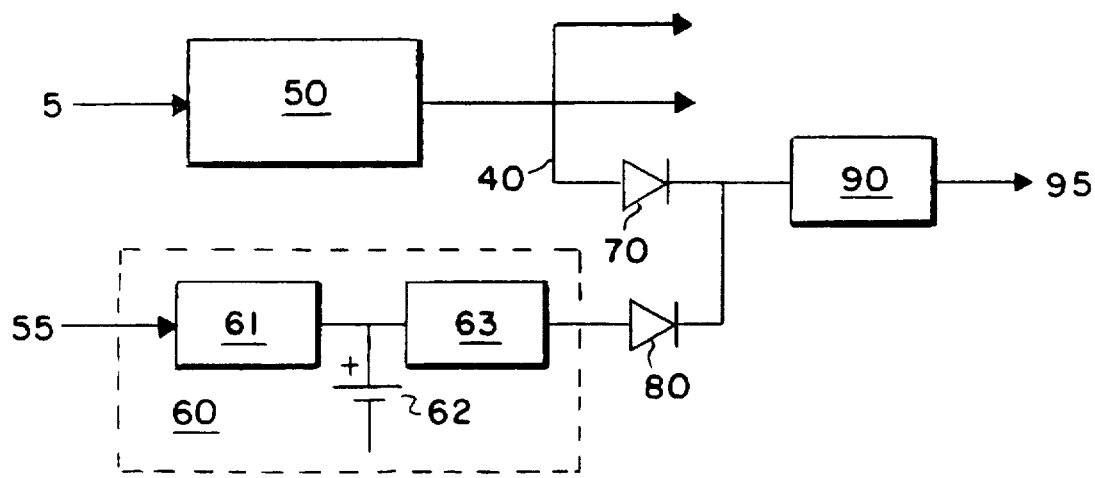
FIG. 2 depicts a prior art front end computer power system with battery back-up for a memory system.
Figure 3:
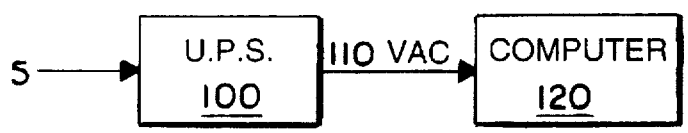
FIG. 3 depicts a U.P.S. in conjunction with a computer load.
Figure 4:
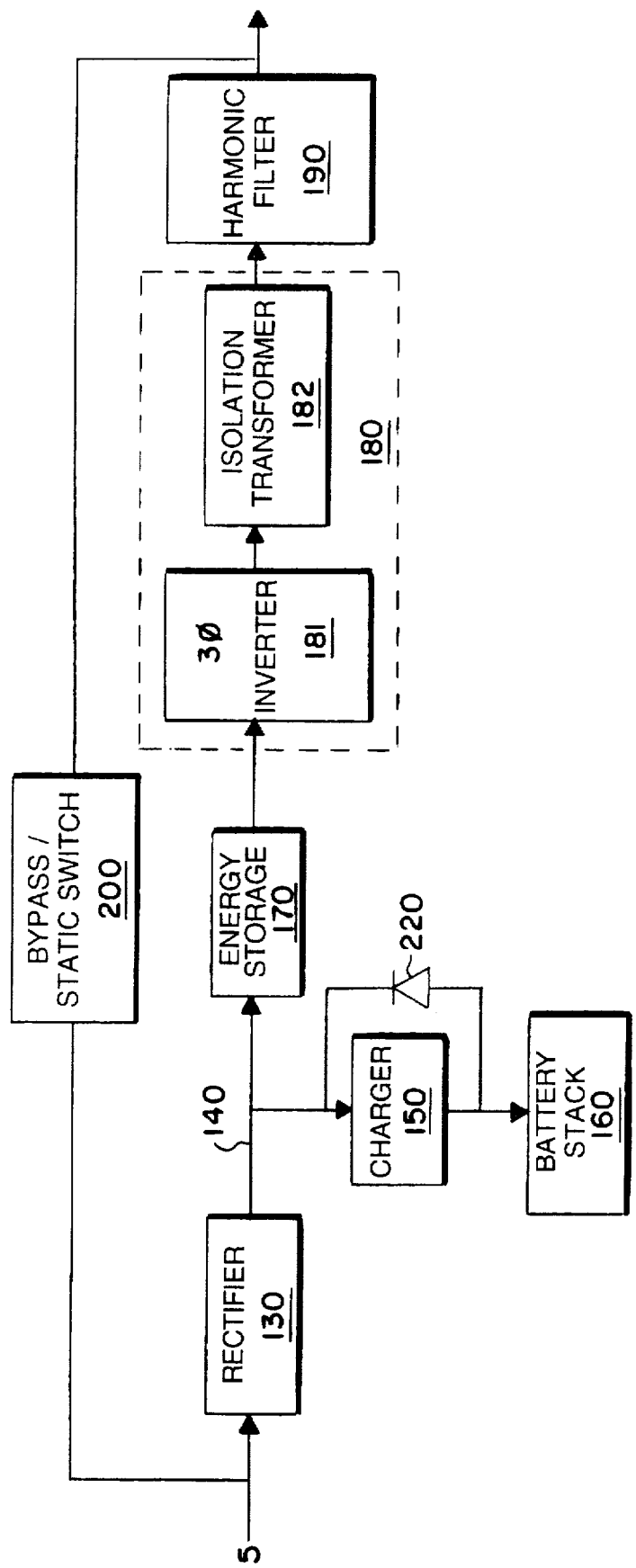
FIG. 4 depicts a prior art U.P.S.
Figure 5:
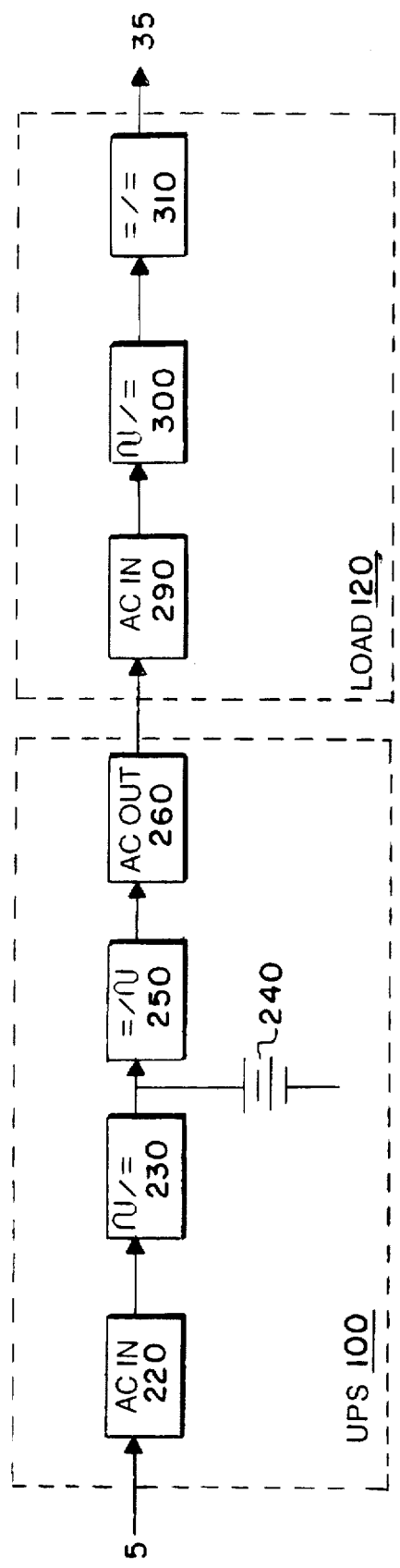
FIG. 5 depicts a prior art U.P.S. used in conjunction with a prior art front end computer power supply.
Figure 6:
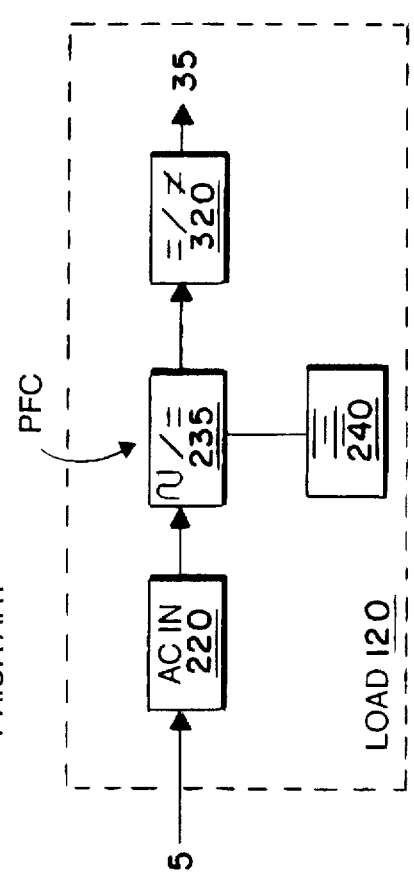
FIG. 6 depicts a line-to-DC embodiment of the invention used as a front end computer power supply.

FIG. 6 shows how a line-to-DC transverter module of the instant invention may be used in a computer or critical load to eliminate the functional blocks 250, 260, 290, and 300. In the architecture of the invention, rectifier 235, although similar to rectifiers 230 and 300 in FIG. 5, also includes power factor correction circuitry as well as circuitry for cutting in power from battery stack 240. The DC output, typically at a high voltage such as 300 VDC, may be used to power the load, omitting block 320, so that rectifier 235 would be the transverter module. Alternatively, the output from rectifier 235 may be stepped down to 48 VDC (in distributed power configurations), 24 VDC, or down to logic power of 5 VDC or less, according to the particular function, using a "buck" DC/DC converter 320 that is essentially identical to converter 310 in FIG. 5, so that the line-to-DC transverter would include rectifier 235 and DC/DC converter 320.

The purposes of line-to-DC transverter 235 (and 320) are (a) to provide a very high power factor to the utility; (b) to provide a means of utilizing energy stored in batteries; (c) to provide galvanic isolation between the input and output of the transverter; and (d) to provide a conditioned DC output capable of powering a critical load.

Figure 7:
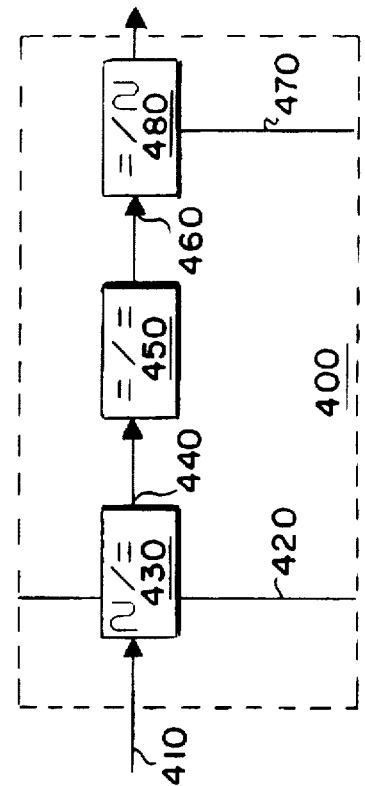
FIG. 7 is a block diagram showing the functionality of a line-to-AC transverter.

FIG. 7 is a functional block diagram of a line-to-AC transverter module 400 used in this invention, which has the same purposes set forth for the line-to-DC transverter, except that a conditioned AC output is provided to power a critical load. The line-to-AC transverter is divided into three sections: (i) an AC/DC power factor correction battery transfer boost converter 430; (ii) a DC/DC isolation converter 450; and (iii) a DC/AC inverter 480. The rectifier/boost converter 430 may be identical to rectifier 235 in FIG. 6.

Figure 8:
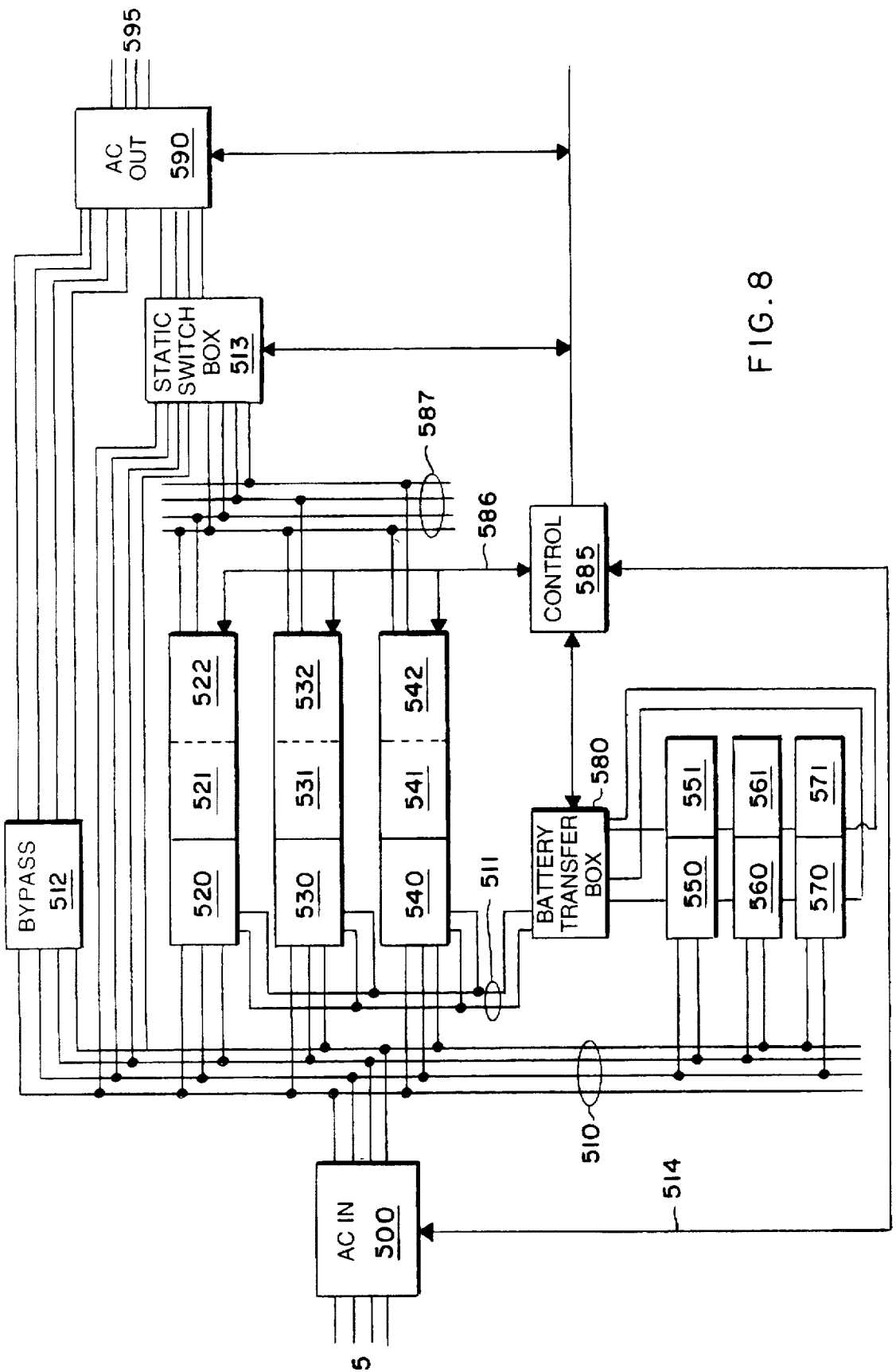
FIG. 8 is a functional block diagram of an embodiment of the invention as a three-phase U.P.S. with fault-tolerant redundancy.

AC power is received through line 410 from an AC bus connected to an AC input such as blocks 220 of FIGS. 5 and 6 or the front end of a stand-alone U.P.S. shown in FIG. 8 as block 500. The AC input blocks provide input power conditioning such as (1) minimization of conducted electromagnetic radiation; (2) protection against the propagation of high voltage transients; and (3) protection against severe overloads. DC power is drawn on line 420 from a high voltage DC bus when the line voltage is inadequate, according to control signals received on line 421. Control signals are also received on line 470 to control the conversion by inverter 480 of the DC power on line 460 into an AC signal for output from transverter 400. The AC output of line-to-AC transverter 400 in the U.P.S. stand-alone implementation is subject to further conditioning similar to that at the AC input block.

A transverter suitable for use in the architecture of the instant invention would provide 3500 watts of DC power at 200–400 VDC (or lower, depending on the application), which is tightly regulated, has fast dynamic characteristics, and is isolated from the AC input; or 3500 watts of 120 VAC or 240 VAC at 50 or 60 Hz. The AC output would be a high quality, fast responding sine wave output with very low distortion, achieved through switching at very high frequencies (100–200 KHz), which also allows the use of lighter cores for inductors. Such a transverter, shown in FIG. 7 in functional block form as 400 (or in FIG. 8 as 520) and in FIG. 12 as a single module with a handle 801, AC input connections 803, battery input connections 802, output connections 804, and control connections 805, weighs approximately forty pounds.

Additional details of the transverter and discussion of other components and subassemblies of the architecture of the instant invention are discussed in the following description of the stand-alone U.P.S.

FIG. 8 is a simplified diagram of an implementation of the invention as a stand-alone 20 KVA U.P.S. for three phases with redundancy both at the transverters 520–522, 530–532, and 540–542 and at the battery/chargers 550, 551, 560, 561, 570, and 571. A single phase system could be created by elimination of components, for example, transverters 530–532, and 540–542.

The AC input sub-assembly 500 provides AC power to the AC input distribution bus 510. The 20 KVA AC input box is standardized in the architecture of this invention, containing, among other components, a circuit breaker, a contactor, transient suppression, EMI filtering, voltage and current monitoring capability and a suitable AC input connector.

Figure 10:
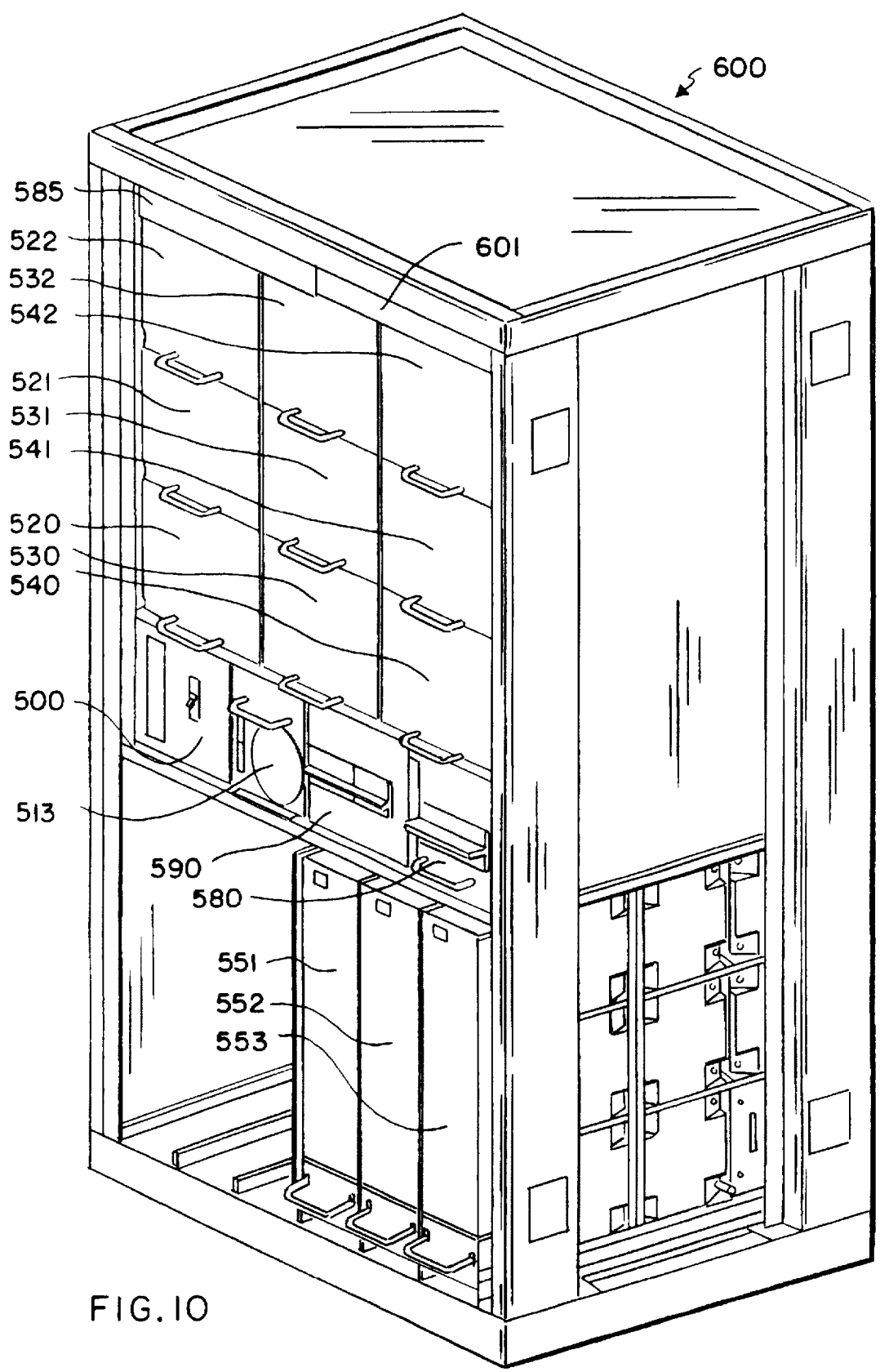
FIG. 10 is a depiction of the three-phase U.P.S. embodiment of the invention in one cabinet.
Figure 11:
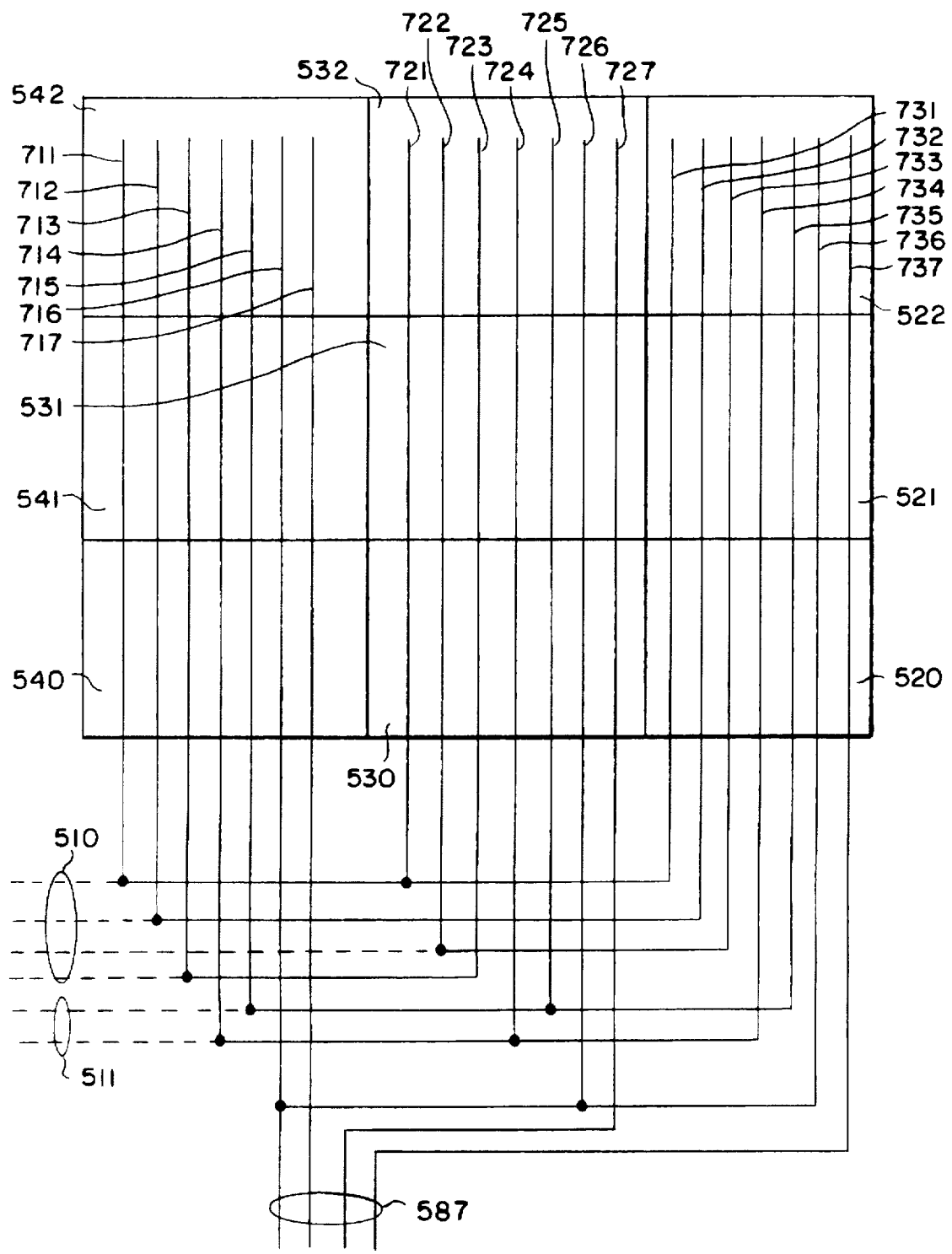
FIG. 11 depicts the power bus structure of the three-phase U.P.S. embodiment of the invention in one cabinet.

The AC input distribution bus 510 is shown in FIG. 11 as implemented with vertical bus bars 711–713, 721–723, and 731–733 at the rear of the cabinet shown in front view in FIG. 10. These bus bars respectively distribute power to each of the parallel transverter sets 540–542, 530–532, and 520–522, which are organized according to phases. They are electrically connected to the transverter modules through plugs exemplified by the male plug connector 803 shown in FIG. 12.

Figure 12:
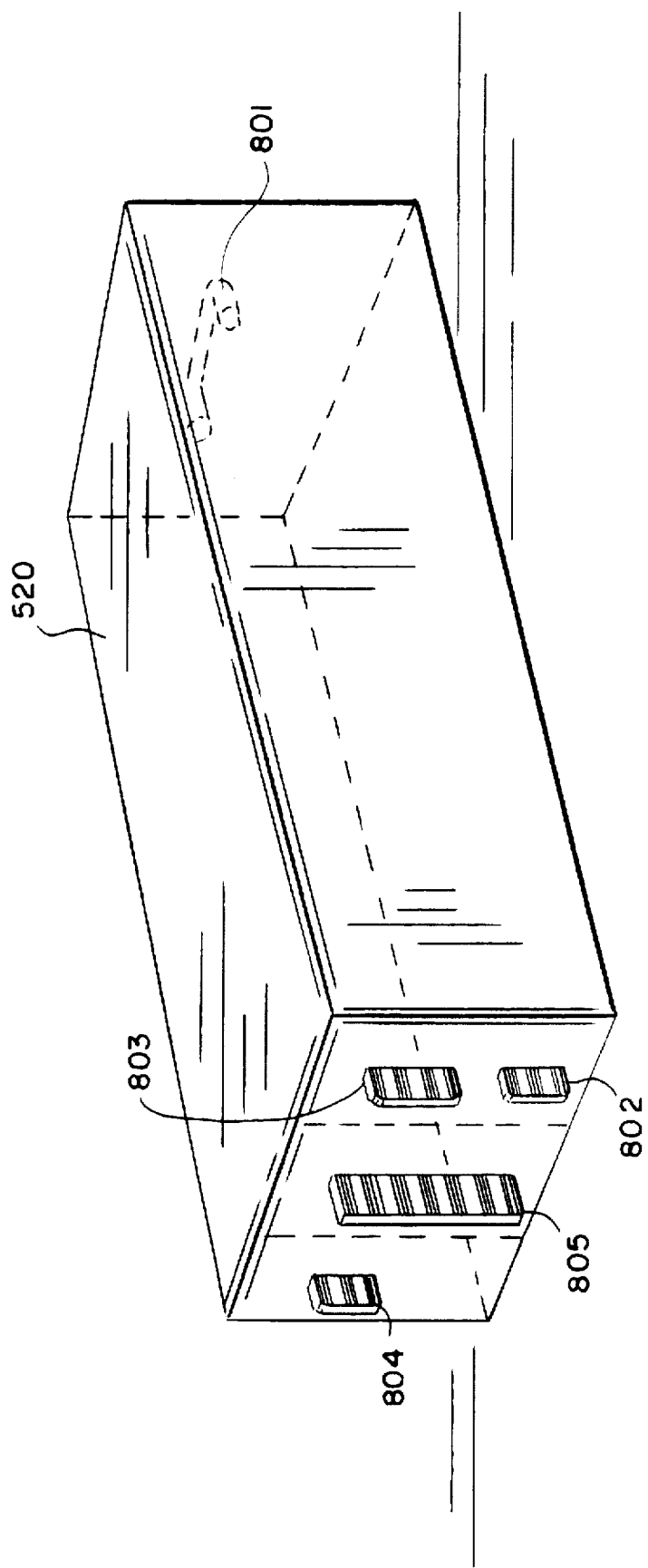
FIG. 12 is a depiction of a transverter.

In the illustrative embodiment, each transverter is shown to have three AC input connections (see 803 in FIG. 12). Each transverter is shown to be connected to neutral or to ground (the connections are shown in FIG. 11 as bus bars 711, 721 and 731) and to two of the phases output from AC input box 500. For a given utility input configuration, only two of these connections may be used.

For example, in FIG. 11, transverters 520–522 are each connected to bus bars 732 and 733, which are associated with two phases of a three phase input. This is to allow a single transverter configuration for U.S. and European utilities, which respectively supply power at 120 VAC and 240 VAC. Instead of inputting into the transverters the 120 VAC across the yoke of the "wye" (phase-to-neutral) in the three phase utility, the transverters receive an approximately 210 VAC potential between yokes or phases in a "delta" connection. This value being close to the 240 VAC of European utilities, the same components may be used for both line voltages, and thus a single version of the transverter may be used in both markets (in Europe, only one of the phases would be connected for each transverter).

The output of the transverters are in three phases on the output distribution bus 587 (including neutral bus bars 716, 726 and 736 and phase outputs on bus bars 717, 727, and 737 in FIG. 11). Thus, each transverter has two AC output connections 804 (FIG. 12).

The battery bus 511 provides a high voltage (200–300) VDC to a second power input located on each transverter (see 802 in FIG. 12). The transverters utilize power from this bus whenever a voltage sag or voltage outage occurs on the AC input distribution bus 510 as detected by the control circuitry 585. Three battery/charger modules 550, 560, and 570 (each with 96 VDC), are connected in series to provide approximately 288 VDC to the input of the battery transfer box 580, which provides that power to the transverters when the transverters are instructed by control box 585 on control lines 586 to cut in battery power. Three additional battery/charger modules 551, 561, and 571 (each with 96 VDC) may also be connected in series and supply 288 VDC to the battery transfer box 580 in parallel with the main set of batteries to provide fault-tolerant redundancy or double the time of alternative power.

Each battery/charger 550, 551, 560, 561, 570, and 571, is standardized in the architecture, containing eight maintenance-free 12-volt 25-ampere-hour batteries connected in series. Each has a power factor corrected charger charging two banks of four batteries in series and appropriate monitoring interface circuits. Three modules form one set of battery support. Each set of battery support will provide approximately seven minutes of energy for a 20 KVA U.P.S. or 15 minutes of energy for a 10 KVA U.P.S. The illustrative embodiment allows two sets of battery support for up to 15 minutes of energy for a 20 KVA U.P.S.

Although not shown, the battery transfer box 580 may have a second port for providing DC to an external device, for example, a transverter installed as the front end of a critical load. As standardized for the architecture in this invention, the battery transfer box couples up to two sets of batteries within a system configuration (shown in FIGS. 8 and 9) and up to two additional sets of batteries located in an external battery expander cabinet (not shown). The battery transfer box 580 may contain filters, circuit breakers, and, in some implementations, may provide switching for cutting in of battery power according to control signals from control circuitry 585. As shown in FIG. 10, battery transfer box 500 may be removable from the front of U.P.S. platform 600.

The maintenance bypass switch 512 provides a means for connecting the AC input 500 to the AC output 590 manually during service operations, bypassing the transverters. The static switch box 513 is used to bypass the transverter assemblies when an overload condition exists or if a transverter failure occurs; in the illustrative embodiment, the static switch box 513 is implemented with six SCRs (alternatively, three SCRs may be used), and, as shown in FIG. 10, is removable from the U.P.S. platform 600 for ready substitution.

In the illustrative embodiment shown in FIG. 8, the control box 585 contains monitoring functions and control implemented on a printed circuit board containing analog and digital circuitry, including a Motorola 6800 microprocessor. The board contains the system state control and transverter analog control circuits. It also includes diagnostic circuits to indicate which sub-assembly box has failed. Voltage and current monitoring/reporting/calculating circuits, as well as the circuits which determine battery state, are also included. Associated with the control box 585 is a bias assembly 601 (FIGS. 9 and 10), including a bias module which provides voltage for the monitoring and control circuits and an interconnect/bias filter module which provides a single control/monitoring connection point and additional bias supply filtering.

Figure 9:
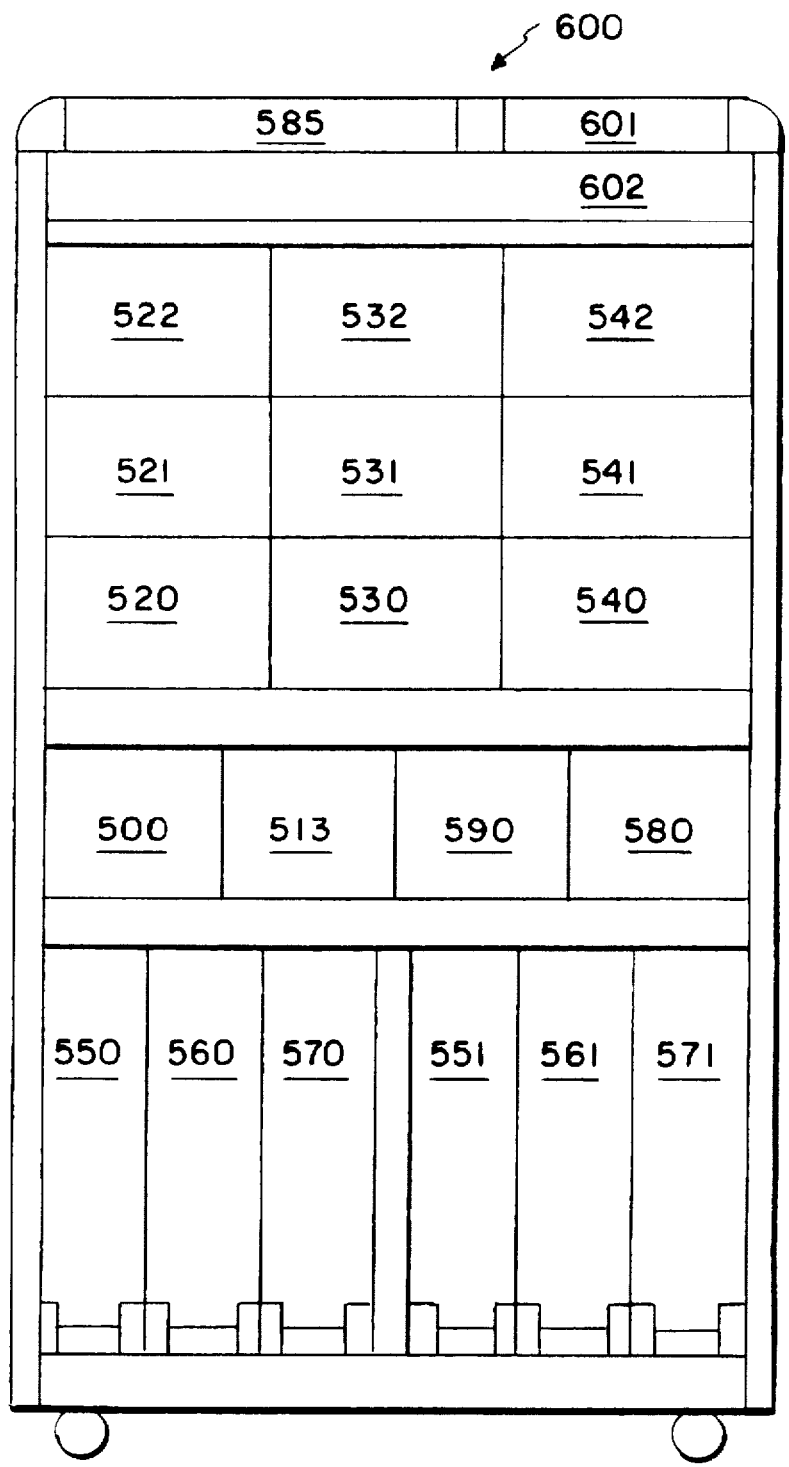
FIG. 9 depicts the three-phase U.P.S. embodiment of the invention as modules organized in one cabinet.

Shown as 602 in FIG. 9, but in actuality, located on the platform or cabinet door, is an operator control panel which contains a removable on-off switch, EPO buttons, a keypad for data entry and requests and an 8-line by 40-character LCD display.

The stand-alone U.P.S. platform is depicted in FIGS. 9 and 10. The platform 600 is the size of a large refrigerator, being a cabinet 1 meter wide, 1.7 meters tall and 0.87 meters deep. The top of the cabinet provides space for a system control module 585 and bias supply 601. Space for an operator control panel 602 is located immediately below this area on the front door. As mentioned previously, the platform may house up to nine transverters 520–522, 530–532, and 540–542, six battery/charger assemblies 550, 551, 560, 561, 570, and 571, and the AC input box 500, the static switch box 513, the AC output box 590, and the battery transfer box 580. One implementation of the power bus structure on the back plane of the platform is shown in FIG. 11.

As suggested above, the platform may be used with the appropriate modules of this architecture to provide a 20 KVA three-phase U.P.S. or a 10 KVA three-phase U.P.S. with or without redundancy at the transverter lever and with or without battery redundancy or doubling of battery time. The platform may be used to provide one-phase U.P.S. The static switch 513 may be omitted if full U.P.S. functionality is not required. As anticipated at the outset, if the line-to-DC transverter modules are to be substituted for front end power supplies for computers or other critical loads, the platform may be used to house battery/charger assemblies 550, 551, 560, 561, 570, and 571 and other appropriate modules, such as the battery transfer box 580.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An uninterruptible electrical power supply having as an input N phases of AC input, where N is an integer greater than one, said power supply comprising:

N conversion modules, each of said N conversion modules containing circuitry for selectably converting to DC output power either one of said N phases of AC input power or DC input power both provided to that module, each of said conversion modules containing means for converting the DC output power to regulated AC output power, wherein each said conversion module provides power factor correction when it converts one of said N phases of AC input power and accepts DC input power for conversion to DC output power when said one of said N phases of AC input power falls below a predetermined level;

control circuitry sending a signal to each said conversion module to control each said conversion module such that the AC output power provided by each of said conversion modules can be combined together in N phases; and an output bus, each conversion module being connected to the output bus, the output bus receiving the regulated AC output power from each conversion module to provide N phases of AC output power for powering an electrical device.

2. The uninterruptible electrical power supply of claim 1 wherein each of said conversion modules is substantially identical.

3. The uninterruptible electrical power supply of claim 2 further comprising:

N AC input bus bars each carrying one phase of said N phases of said AC input and one neutral bus bar relative to such phases and wherein each of said N conversion modules may be connected either (a) to a unique one of said N AC input bus bars and to said neutral bus bar or (b) to a unique pair of said N AC input bus bars.

4. The uninterruptible electrical power supply of claim 1 wherein each of said N conversion modules is capable of converting at least 1000 watts of power.

5. The uninterruptible electrical power supply of claim 1 further comprising:

a first set of battery modules connected in a series, said first set connected through battery transfer means to one or more of said conversion modules, said battery transfer means including means for providing battery voltage to one or more external devices.

6. The uninterruptible electrical power supply of claim 5 further comprising:

a second set of battery modules connected in a series, said second set of battery modules connected in parallel with said first set of battery modules.

7. The uninterruptible electrical power supply of claim 6 wherein said second set of battery modules is located in an external battery expander cabinet.

8. An uninterruptible electrical power supply comprising:

an AC input power bus supplying AC input power with at least one phase;

a DC input power bus supplying DC input power;

a plurality of conversion modules, each of said conversion modules containing circuitry for selectably converting to DC output power either AC input power provided on said AC input power bus or DC input power provided on said DC input power bus, each said conversion module including an inverter for converting said DC output power to regulated AC output power with one phase, each said conversion module being connected in parallel to said AC input power bus and said DC input power bus;

control circuitry sending a signal to the inverter of each conversion module to control the inverters such that the AC output power provided by each of said conversion modules can be combined together in one or more phases; and an output bus, to which the conversion modules are connected in parallel, receiving the AC output power provided by each of the conversion modules.

9. The uninterruptible electrical power supply of claim 8 wherein the DC input power is supplied by batteries external to the cabinet.

10. The uninterruptible electrical power supply of claim 8 wherein the DC input power is supplied by one or more battery modules mounted within the cabinet.

11. The uninterruptible electrical power supply of claim 8, wherein the AC input bus has a input bus bar for each of the phases of AC input power, the AC output bus has an output bus bar for each particular phase of AC output power, and each conversion module is connected to the same one of the input bus bars and to the same one of the output bus bars, the same one of the output bus bars receiving AC output power from each conversion module to provide an overall AC output power having one phase.

12. The uninterruptible electrical power supply of claim 8, wherein the AC input bus has an input bus bar for each phase of the AC input power, the AC output bus has an output bus bar for each particular phase of the AC output power, and each conversion module is connected to a different input bus bar and a different output bus bar than each other conversion module, the output bus receiving from the conversion modules AC output power having more than one phase.

13. The uninterruptible electrical power supply of claim 12 wherein a DC input voltage supplied on the DC input bus is between 200 and 300 volts, inclusive.

14. The uninterruptible electrical power supply of claim 8, further comprising:

a cabinet; and means for mounting the plurality of conversion modules within the cabinet.

15. The uninterruptible electrical power supply of claim 8 wherein each conversion module includes a power factor correcting circuit for conditioning either the AC input power or the DC input power.

16. The uninterruptible electrical power supply of claim 8, further comprising:

AC input circuitry for conditioning utility AC power to be provided to the AC input power bus.

17. The uninterruptible electrical power supply of claim 8, further comprising:

one or more battery modules for supplying the DC input power bus with battery power, each battery module including one or more batteries.

18. The uninterruptible electrical power supply of claim 17, further comprising:

battery transfer circuitry for transferring DC input power from the battery modules to the DC input bus whenever said AC input power drops below a threshold level.

19. The uninterruptible electrical power supply of claim 18, further comprising:

static switching circuitry for bypassing the conversion modules when an overload condition or a conversion module failure is detected.

20. The uninterruptible electrical power supply of claim 19, further comprising:

maintenance bypass switching circuitry manually engageable for bypassing the conversion modules for servicing.

21. The uninterruptible electrical power supply of claim 17, further comprising:

a cabinet; and means for mounting each of the battery modules within the cabinet.

22. The uninterruptible electrical power supply of claim 8 wherein said DC output power is greater than 1000 watts.

23. An uninterruptible electrical power supply, comprising:

an AC input power bus supplying AC input power;

a DC input power bus supplying DC input power;

one or more conversion modules connected to the AC and DC input power busses, each of the conversion modules selectably converting either AC input power provided on an AC input power bus or DC input power provided on a DC input power bus to AC output power;

one or more battery modules for supplying the DC input power bus with battery power, each battery module containing one or more batteries;

battery transfer circuitry for transferring DC input power to the DC input power bus from the battery modules whenever the AC input power drops below a threshold level; and static switching circuitry coupled to the AC input bus for bypassing the conversion modules when an overload condition or a conversion module failure is detected.

24. The uninterruptible electrical power supply of claim 23 wherein each of the conversion modules includes:

circuitry for selectably converting either the AC input power or the DC input power to DC output power; and means responsive to the DC output power for converting the DC output power to the AC output power.

25. The uninterruptible electrical power supply of claim 23, further comprising:

maintenance bypass switching circuitry manually engageable for bypassing the conversion modules for servicing.

26. The uninterruptible electrical power supply of claim 25, further comprising:

AC input circuitry for conditioning utility AC input power to be provided to the AC input power bus.

27. The uninterruptible electrical power supply of claim 23, further comprising:

control circuitry for controlling the battery transfer circuitry and the conversion modules.

28. The uninterruptible electrical power supply of claim 23 wherein each of the conversion modules includes:

circuitry for selectably converting either the AC input power or the DC input power to DC output power; and means responsive to the DC output power for converting the DC output power to the AC output power.

* * * * *